United States Patent [19]

LeMay

[11] 4,222,688
[45] Sep. 16, 1980

[54] NUT REMOVAL TOOL

[76] Inventor: Lowell LeMay, 8341 Elm Rd., Millersville, Md. 21108

[21] Appl. No.: 22,610

[22] Filed: Mar. 21, 1979

[51] Int. Cl.³ ............................................. B23B 49/02
[52] U.S. Cl. ................................. 408/115 B; 81/3 R
[58] Field of Search .......................... 81/3 R; 29/282; 408/72 B, 115 B, 241 B

[56] References Cited

U.S. PATENT DOCUMENTS

| | | | |
|---|---|---|---|
| 3,589,825 | 6/1971 | Wojcik | 408/241 X |
| 3,661,469 | 5/1972 | Leff et al. | 408/241 X |
| 4,005,945 | 2/1977 | Gutman | 408/115 B |

FOREIGN PATENT DOCUMENTS

| | | | |
|---|---|---|---|
| 969783 | 6/1975 | Canada | 408/241 B |

Primary Examiner—James G. Smith
Attorney, Agent, or Firm—Walter G. Finch

[57] ABSTRACT

The invention is an improved nut removal tool for removing nuts that have been corroded or otherwise jammed or stuck on the stud, bolt, or threaded piece on which they have been installed. The tool is a means for removing the nut so that the stud, bolt, or threaded piece is still useable. The tool consists of a body means which fits over the end of the stud, bolt, or threaded piece and over the nut, and having passageways therein for a drill to pass there-through to reach and drill away portions of the nut so that the nut can be separated into removal parts to remove it from said stud, bolt, or threaded piece. The tool may be configured for various shaped nuts.

10 Claims, 7 Drawing Figures

NUT REMOVAL TOOL

BACKGROUND AND SUMMARY OF THE INVENTION

The invention relates to maintenance type tools and in particular to disassembly type tools. Specifically, the invention concerns a tool for removing nuts that have been corroded, jammed, or stuck in some manner on a stud, bolt, or other threaded piece.

A need has existed for a long time for a tool to remove a nut from a stud, bolt, or other threaded piece without destroying the stud, bolt, or other threaded piece. In the past the nut has often been "burned" off with an acetylene type torch, thus destroying the stud, bolt, or other threaded piece on which the nut was located. In other cases the nut has been laboriously sawed off, and at the same time damaging the stud, bolt, or threaded piece so that replacement is necessary. Often, replacing the stud, bolt, or threaded piece becomes difficult because the arrangement of the assembly and considerable time and expense is involved because one nut could not be removed easily. The present invention overcomes these difficulties.

The present invention consists of a body means that has a passageway that fits over the end of the stud, bolt, or other threaded piece and also over the nut. The body means can be configured to fit square, hexagonal, or any type of nut. The body means can also be made in a range of sizes to fit over a range of stud, bolt, or other threaded piece diameters.

A plurality of passageways (usually two, but more may be used) are provided adjacent to the passageway into which the end of the stud, bolt, or other threaded piece has been inserted. These passageways are for a drill that will be used to drill away that portion of the nut on the outside of the stud, bolt, or other threaded piece. Once at least two such drillings have been made the weakened nut structure may be broken or split away from the stud, bolt, or other threaded piece.

Note that as the drill passes through the nut on the outside edges of the stud, bolt, or other threaded piece, it is cutting away the nut at the outside diameter of the threads of the stud, bolt, or other threaded piece. This leaves a small amount of metal of the nut that is actually the threads of the nut that mesh in the threads of the stud, bolt, or other threaded piece. The cut nut (at least one drilled place on each side) may break away easily or may need a blow from a hammer or other means or need a twist by a wrench to break any remaining small amount of contact.

An alternative is to have the edges of the passageways for the drill overlap the outside diameter circle of the passageway for the stud, bolt, or other threaded piece. This will drill away a small portion of the threads on each side of the stud, bolt, or threaded piece, but will not destroy the reuse of the stud, bolt, or threaded piece. However, in this case, it must be determined that the removal of a small portion of the threads will not weaken the stud, bolt, or other threaded piece beyond safe reuse. This is an optional method and embodiment of the invention and is within scope and intent of the invention. However, the previously described embodiment that proves for drilling at the outside diameter of the stud, bolt, or other threaded piece is the preferred embodiment.

The configuration of the outside of the body means may be square, hexagonal, or other shape for convenience of handling and, if necessary, for holding in place with a wrench or other means.

Passageways are also provided in one or more sides or surfaces of the body means, that extend on a centerline direction toward the passageway for the end of the stud, bolt, or other threaded piece. A pin or bar means may be inserted in one of these passageways in order to hold the body means on the end of stud, bolt, or other threaded piece in a cramped location or situation where other means for holding the nut removal tool are not possible.

The nut removal tool is of hardened metal, usually steel. The hardening provides for wear in use, including wear where drills revolve in drill guide passageways.

It is, therefore, an object of the invention to provide a nut removal tool that can be used to remove corroded, jammed, or otherwise stuck nuts from studs, bolts, or other threaded pieces.

It is another object of the invention to provide a nut removal tool that can be made in a range of sizes for all diameters of studs, bolts, or other threaded pieces.

It is also an object of the invention to provide a nut removal tool that made in a range of sizes can be used on all configurations of nuts.

It is yet another object of the invention to provide a nut removal tool that has a means for utilizing it in cramped or difficult locations.

Further objects and advantages of the invention will become more apparent in the light of the following description of the preferred embodiments.

DESCRIPTION OF THE PREFERRED EMBODIMENTS

Figure 1:
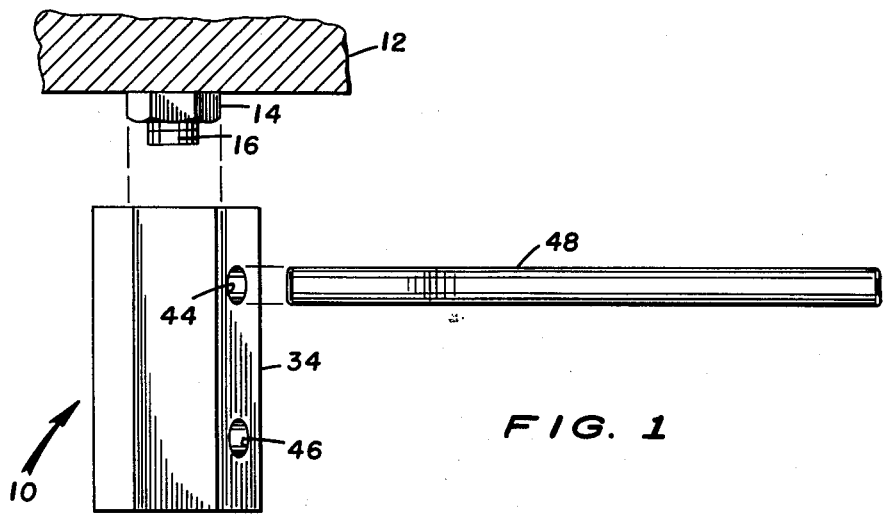
FIG. 1 is an exploded view of a nut removal tool in relation to an unremovable nut on a stud.

Referring to the drawings and particularly to FIG. 1, a nut removal tool 10 is shown at 10 in relation to a nut 14 corroded, jammed, or otherwise stuck or unremovable on a stud in a piece of equipment 12.

It is to be noted that in this specification the stud 16 may also represent a bolt, or other threaded piece on which a nut 14 could be corrded, jammed, or otherwise stuck or be unremovable. Also, in the specification, the nut 14 is shown as being of a hexagonal configuration, but it is to be understood that it may be square or any other configuration and the nut removal tool 10 designed in a configuration to accommodate such nut configuration as hereinafter described. Such variations are within the scope and intent of this invention.

Figure 4:
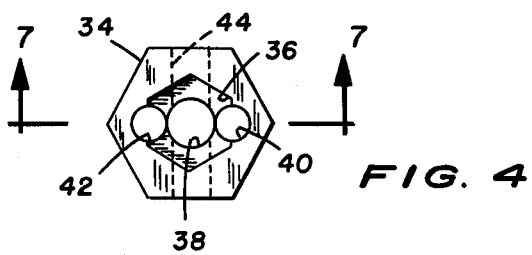
FIG. 4 is a top end view of a nut removal tool.
Figure 5:
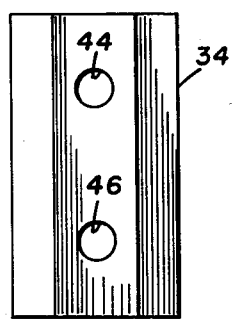
FIG. 5 is a side view of a nut removal tool.
Figure 6:
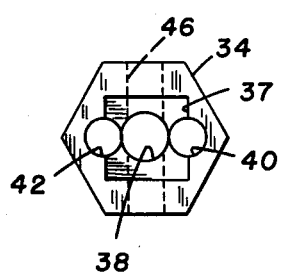
FIG. 6 is a bottom end view of a nut removal tool.

Further, it is to be noted that the body 34 of the nut removal tool 10 is shown as being of a hexagonal configuration in FIGS. 4 and 6. It is to be understood that the body may be square or any other configuration and such variation is within the scope and intent of this invention.

Referring to FIGS. 4, 5, 6, and 7, the nut removal tool 10 has a body 34, said body 34 having a recess and passageway as hereinafter described.

A recess 36 or 37 is centrally located in one end of the body 34. The recess 36 or 37 is configured to fit over the nut 14 which is to be removed. As shown recess 36 is for hexagonal nuts and recess 37 is for square nuts with one of each recess 36 and 37 in the opposite ends of tool 10, the tool has a universal use.

Centrally located in the recess 36 and 37 is a cylindrical passageway 38 through the body 34, said passageway 38 fits over the stud 16. As hereinbefore specified, the nut removal tool 10 may be provided in a range of sizes of passageways 38 to fit a range of sizes of studs (bolts or other threaded pieces) 16, and a range of sizes of recesses 36 and 37 to fit a range of sizes and configurations of nuts 14.

Figure 7:
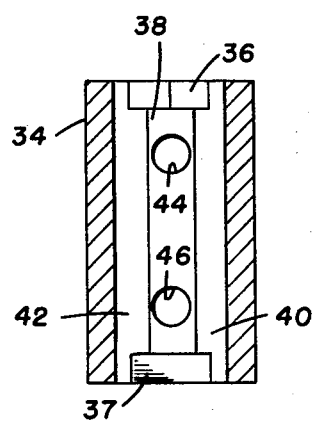
FIG. 7 is a sectional view on line 7—7 of FIG. 4.

A plurality of other passageways through the body 34 are placed around and tangent to the passageway 38. The plurality of other passageways, usually at least two are for guidance of a drill bit. Two such passageways 40 and 42 for a drill bit (not shown) are seen in FIGS. 4, 6, and 7.

When the nut removal tool 10 is placed over the stud 16 and nut 14 it may be held in place by hand, a wrench, pliers, or other means while the nut 14 is cut away by a drill bit as hereinafter described.

If the space is cramped or relatively inaccessible for use of the hand, a wrench, or other means to attach the outside surface of the body 34, a pin 48 may be used to hold the nut removal tool 10 in place. The pin 48 is shown with one end slightly bent at an angle for convenience of use, however, it is to be understood that it is within the scope and intent of the invention to use it straight (unbent) or bent at a more severe angle.

The pin 48 is inserted in either of the passageways 44 or 46 from either side of the nut removal tool 10. Two passageways 44 and 46 for a pin 48 are shown in the body 34, however, it is within the scope and intent of this invention to use any number of such passageways for optional positioning of the pin 48.

Figure 2:
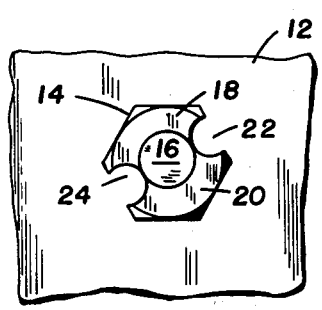
FIG. 2 is an end view of a first embodiment of a nut cut away for removal.

When the nut removal tool 10 is held in place over the stud 16 and the nut 14 which is to be removed, a powered drill bit (not shown) is inserted first in passageway 40 and then in passageway 42 which guide the powered drill bit to a position over the nut 14. As the drill bit cuts through first one side and then the other side of nut 14, the cut nut 14 will take on the configuration shown in FIG. 2. The cut away portions 22 and 24 of the nut 14 weaken the nut 14 structure so that the nut 14 can be easily broken away in two sections 18 and 20 from the stud 16.

Figure 3:
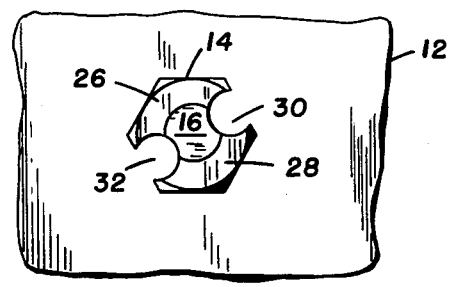
FIG. 3 is an end view of a second embodiment of a nut cut away for removal.

A second embodiment of the nut removal tool 10 provides for the two passageways 40 and 42 for the guidance of a powered drill bit to overlap into the area of the stud 16 as hereinafter described. In this latter arrangement, the cutaway portions 30 and 32 of nut 14 shown in FIG. 3 also cut into the stud 16 as shown. This makes it easier to break away the two sections 26 and 28 of nut 14. However, as hereinafter mentioned, this cutting away of a portion of stud 16 may weaken the stud 16 an unacceptable amount. This weakening factor must be taken into account if this method is used.

As can be readily understood from the forgoing description of the invention, the present structure can be configured in different modes.

Accordingly, modifications and variations to which the invention is susceptible may be practiced without departing from the scope and intent of the appended claims.

What is claimed is:

1. A nut removal tool for removing unremovable nuts, comprising:
    a body means;
    a combination recess and first passageway in said body means, said first passageway passing longitudinally through said body;
    a plurality of additional passageways through said body to serve as drill guides; and
    a holding means which can be attached to said body means to hold said nut removal tool in position.

2. The nut removal tool recited in claim 1, wherein said body means has a first planar surface and a second planar surface spaced apart, with a geometrically formed body connecting said planar surface.

3. The nut removal tool recited in claim 2, wherein said recess is configured to fit over said unremovable nut and said first passageway is configured to fit over a threaded member on which said unremovable unit is installed.

4. The nut removal tool recited in claim 3, wherein said plurality of additional passageways are adjacent to said first passageway and tangent thereto at the peripheries thereof.

5. The nut removal tool recited in claim 4, wherein said recess in combination with said first passageway and said plurality of additional passageways extend from said first planar surface to said second planar surface and communicating the exterior of said first planar surface with the exterior of said second planar surface.

6. The nut removal tool recited in claim 1, wherein said holding means is a pin-like member which is inserted in one of a plurality of passageways transversely through said body.

7. The nut removal tool recited in claim 1, wherein said holding means is a wrench.

8. The nut removal tool recited in claim 1, wherein said tool is provided in a range of sizes for a range of nut sizes.

9. The nut removal tool recited in claim 3, wherein said recess is of a first configuration for a nut, and additionally, a second recess at the distal end of said first passageway, said second recess having a second configuration for a nut, said recess lies in said first planar surface and said second recess lies in said second planar surface.

10. The nut removal tool recited in claim 3, wherein said plurality of additional passageways are adjacent to said first passageway with the peripheries of said additional passageways overlapping the periphery of said first passageway.

* * * * *